United States Patent [19]

Malaval

[11] 4,120,753

[45] Oct. 17, 1978

[54] SOLID ABSORBANT SAFETY DEVICE FOR A NUCLEAR REACTOR

[75] Inventor: Claude Malaval, Antony, France

[73] Assignee: Groupement Atomique Alsacienne Atlantique, Le Plessis Robinson, France

[21] Appl. No.: 641,323

[22] Filed: Dec. 16, 1975

Related U.S. Application Data

[63] Continuation of Ser. No. 416,140, Nov. 15, 1973, abandoned.

[30] Foreign Application Priority Data

Nov. 21, 1972 [FR] France .................. 72.41261

[51] Int. Cl.² ............................................ G21C 7/06
[52] U.S. Cl. ..................................... 176/86 R; 176/22
[58] Field of Search .................. 176/22, DIG. 5, 86, 176/35, 36

[56] References Cited

U.S. PATENT DOCUMENTS

| 2,987,455 | 6/1961 | Huston et al. ............... 176/DIG. 5 |
| 3,105,033 | 9/1963 | Camac ............................ 176/22 |
| 3,136,701 | 6/1964 | Sidebottom et al. ............... 176/22 |
| 3,192,123 | 6/1965 | Costes et al. ................... 176/22 |
| 3,347,747 | 10/1967 | West et al. .................... 176/35 |
| 3,390,052 | 6/1968 | McDaniels, Jr. ................. 176/35 |

Primary Examiner—Harvey E. Behrend
Attorney, Agent, or Firm—Sughrue, Rothwell, Mion, Zinn and Macpeak

[57] ABSTRACT

Improvement to a safety device with a solid absorbant which may be used in a water-cooled reactor, essentially constituted by a cylindrical tank placed above the core of the reactor and containing a gas kept under pressure as well as an absorbant in a divided form. The opening device of the tank is sensitive to a depressurization. The tank supplies simultaneously several spouts each leading to a tube implanted in the core of the reactor.

3 Claims, 1 Drawing Figure

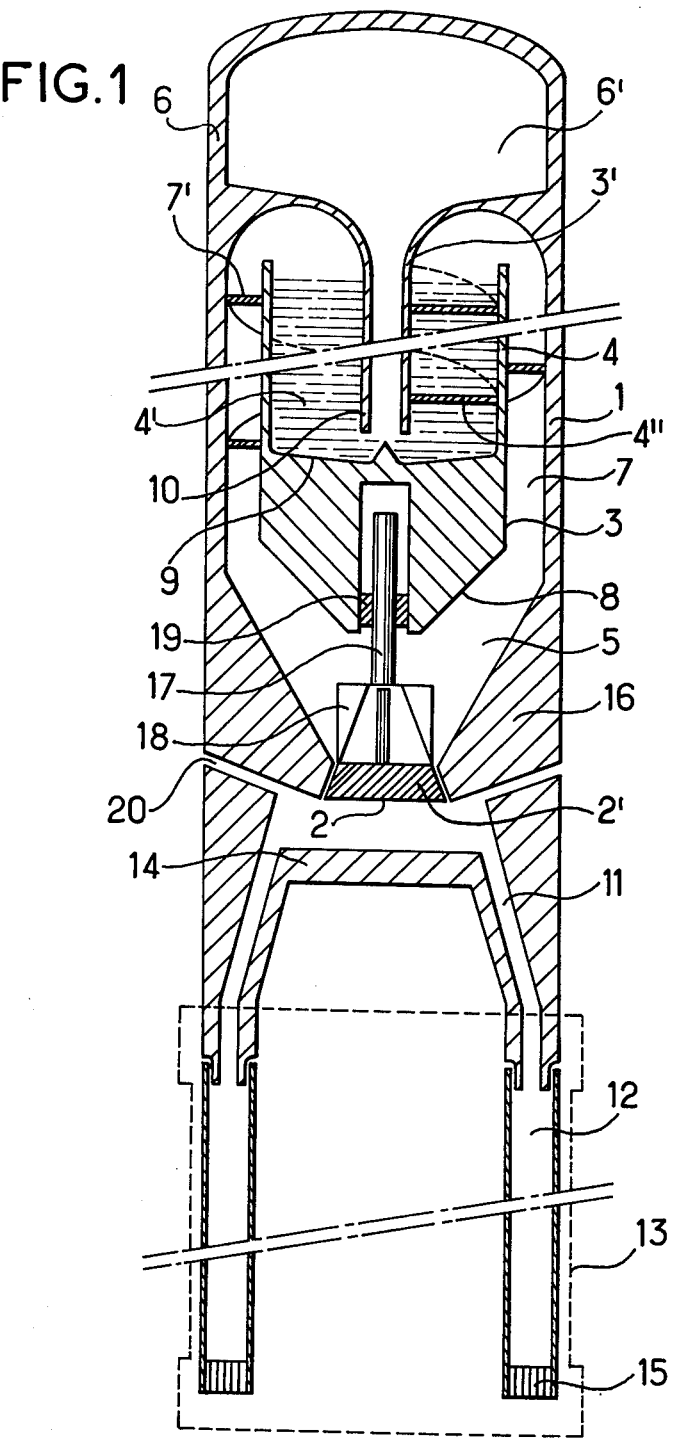

SOLID ABSORBANT SAFETY DEVICE FOR A NUCLEAR REACTOR

This is a continuation, of application Ser. No. 416,140, filed Nov. 15, 1973, now abandoned.

The present invention concerns a safety device with a solid absorbant for a nuclear reactor.

Devices capable of inserting very rapidly a solid absorbant in a volume situated in the core of a reactor without bringing into play an outside power source, nor a maneuvre outside the reactor are already known. The absorbant is then stocked just above the core; it must move only through a distance equal to the height of the core; the re-starting time may then be very short, all the more so as the tripping of the inserting device is automatic.

Such a device is generally constituted by a vertical cylindrical tank filled with gas under pressure comprising an upper part situated in the reactor above the core, provided with elements enabling the solid absorbant to be kept slightly above the core and a lower part provided with means for communicating with the outside, ending in a closing element situated in the core ad whose completeness depends on the operating conditions of the reactor. The tank then generally has a diameter equal to that of the casing used for the fuel. To obtain a satisfactory efficiency, circumstances therefore lead to the replacing of a relatively high number of combustible elements by safety elements which thus take up a great volume.

The present invention applies more particularly, but not exclusively, to water-cooled reactors. Its essential aim is to adapt the structure of such safety devices to water reactors and to reduce the bulk of the safety elements.

In the operation of the device safety according to the invention, the physical state of the primary water is also taken into account, as well as its temperature and its pressure. Moreover, the absorbant in the form of a solid but divided is poured directly by spouts into the control cluster guide tubes with which this type reactor is fitted. It is then possible to have a single tank for storing the absorbant, situated above the fuel assemblies, that tank supplying, in the case of accidents, by means of several guide tubes simultaneously, thus reducing the volume required in the actual core of the reactor. These spouts may also be connected to capacities specially arranged for that purpose in the core of the reactor, more particularly in the case of a reactor not provided with control guide tubes.

The object of the invention is a safety device with a solid absorbant for a water-cooled nuclear reactor, constituted by a vertical cylindrical tank immersed above the core of the reactor extending downwards by spouts ending in the core of the reactor, the said vertical cylindrical tank containing, in its upper part, a fluid kept under pressure, comprising in its middle part, two vertical cylindrical concentric partitions defining, with the wall of the cylindrical tank, from the center towards the outside, a cylindrical volume and two annular spaces connected together in series to constitute the discharge path for the fluid under pressure, one of these spaces forming the storing capacity of the absorbant in divided form, (granulated material or small grains), comprising in its lower part, a closing element and means for affecting the said closing element, characterized in that each tank supplies with absorbing material kept in divided form several distribution spouts each leading to a tube implanted in the reactor core.

The nature of the closing element implemented depends on the conditions against which protection should be provided.

In the case where it is required to protect against the dangers succeeding depressurization accident, an uranium plug sensitive to the neutronic flux is used, as in known devices, brazed on its periphery by means of a fusible metal. In normal operating conditions of a water reactor, the uranium plug is held on its seat partly by the pressure of the primary coolant. Under the effect of the neutronic flux, the uranium plug becomes a heat source cooled by the primary coolant whose circulating is ensured on one of the faces of the plug. In the case of a sudden depressurization of the primary circuit, the counter-pressure exerted the coolant of the plug comes to an end. The brazing heats up and suddenly loses its mechanical strength; the plug is ejected, the gas under pressure actuates the emergency device.

It is therefore seen that in the device according to the invention, it is the depressurization of the primary circuit which affects simultaneously the temperature and the pressure exerted on the plug, whereas in former devices, only the temperature of the plug was modified. The action is therefore more sure and more rapid.

In the case of the normal stopping of a reactor, the primary coolant is depressurized, but it continues to cover the assemblies of fuel and immerses the uranium plug. The neutronic flux is slight and the contact of the plug with the primary coolant is sufficient then to keep it at a normal temperature conferring on the brazing a sufficient strength to remain at the pressure of the internal fluid.

The following description with reference to the accompanying drawings comprises, by way of an example having no limiting character, the combinations constituting the greatest advantages in a particular technical situation;

FIG. 1 shows the use of a closing element which must release itself in the case of depressurization; The safety device shown in a cutaway view in FIG. 1 refers more particularly to a pressurized light water reactor of the type known as "PWR" in which the tank, containing a closing element which must release itself in the case of a depressurization accident.

It comprises in a known way a vertical cylindrical tank 1 closed at its lower end by a closing element 2 or plug within an opening therein. The tank is divided in the direction of the height by two concentric cylindrical vertical partitions 3 and 3' limiting between them an intermediate compartment 4 limited at its base by a wall 9 used for the storing of the solid absorbant 4' in the divided or particulate form of powder, granulated material or small grains. The intermediate compartment 4 comprises a helical fin 4" forming a helical flow path to annular duct 7. The compartment 4 containing the absorbant 4' communicates with the lower compartment 5 through an annular duct 7 limited laterally by the wall 1 of the tank and the wall of 3 of the intermediate cylinder. The annular duct comprises also a helical fin 7' forming a helical flow path through the duct. It should be noted that the axial cross-section and the vertical cross-section of the lower compartment 5, narrower at the top, widens out at the towards the base appreciably as FIG. 1 clearly shows. The upper compartment 6 of the tank, containing the fluid under pressure communicates with the intermediate compartment 4 through a tube 10.

The lower compartment 5 is limited by the lower truncated shaped face 8 of the cylindrical body 3 and the bottom 16 of the tank whose lower base has an opening closed up by the closing element 2 in the form of a plug which also has a truncated cone shape.

The lower part of the device comprises a stop 14 intended to stop the closing element 2 when it is ejected and has a distribution spouts 11 situated under the cylindrical tank for directing the absorbant into the guide tubes 12 of the control cluster of the fuel assembly 13 situated in the core of the reactor. The lower part of the guide tubes is provided with strainers 15 intended for allowing the fluid 6' to pass at the instant of its expulsion from the tank but stopping the particles of solid absorbant. The lower part of the device comprises, also, holes 20 intended for the flow of the primary coolant (water). The latter, subsequent to the difference in pressure prevailing between the lower part and the upper part of the core, is propelled upward in the guide tubes 12 of the control clusters, ensures the cooling of the closing element 2 and leaves through the holes 20.

According to FIG. 1b, the closing element 2 is, to great advantage, constituted by a uranium plug 2' enclosed in a truncated cone shaped 2 brazed to the bottom 16 of the cylindrical tank by means of a metal which is fusible at a predetermined temperature. The truncated cone shaped uranium plug stop 2' is provided at its rod 17 and guiding fines 18. When the closing element become detached, the rod 17 slides in the bearing 19; the fins slide on the edge of the hole in the bottom 16, imposing on the closing element a vertical downward movement.

The operation of the safety device is very simple. The device is previously pressurised with a neutral gas 6', helium for example; the closing element is brazed to tank 2 the absorbant 4' is arranged in the intermediate receptable 4. When the nuclear reactor is charged, the device is mounted on a fuel assembly, at a point not equipped with mechanically actuated control clusters guide tubes. Distribution spouts such as 11 are connected up to the control cluster guide tubes 12. The device is ready for operation. In the case of sudden depressurization accompanied by a loss of coolinng in the core, the brazing gives way, as has been stated above, releasing the closing element 2 which is ejected by the gas and received by the stop 14. The gas expands and draws away the absorbant in the control culster guide tubes.

During the descriptions made with reference to the figures, it has been stated that the fluid kept under pressure was a neutral gas.

That condition is not indispensable. It may be an advantage to replace the gas by steam, by a mixture of gas and steam. To make the discharge of the solid absorbant easier, it appeared to be an advantage, in certain cases, to fill partly the volume of the cylinder with water, completed by a gas kept under pressure. Thus a more intense cooling of the internal elements of the device is obtained. Moreover, at the instant when the device comes into operation, the water is made to move with the gaseous phase and draws away the solid absorbant more easily.

Although the devices described above may seem to afford the greatest advantages for ensuring safety in light water reactors, it will be inderstood that various modifications may be made thereto without going beyond the scope of the invention, it being possible to replace, some of the elements composing the device by other elements capable of fulfilling the same technical function therein, more particularly the strainers 12 may be replaced by grids when the solid absorbant is not in the form of fine powder.

I claim:

1. In combination, a water cooled reactor and a safety device, said reactor comprising:
   water maintained under pressure within said reactor,
   a core immersed in said water and comprising several elongated vertical guide tubes open to said water,
   said safety device comprising:
   a vertical cylindrical tank mounted above said core and immersed in said water,
   conduit means connecting the bottom of said tank to said tubes,
   means forming within said cylindrical tank, fluid connected, upper, lower and intermediate compartments,
   absorbant in particulate form within said intermediate compartment,
   an opening within said lower compartment providing fluid communication between said conduit means and said lower compartment,
   fluid under pressure within said tank upper compartment,
   a closing element closing off said opening at the bottom of said lower compartment, said closing element comprising a uranium plug brazed at its periphery by means of a fusible metal to the tank wall defining said opening;
   whereby, in response to depressurization of the water within which said core and said tank are immersed, said plug is ejected by a pressure differential existing between said tank interior and exterior upon overheating of the brazed metal to initiate a rapid flow of pressurized fluid from said tank to said elongated guide tubes with fluid flow through said intermediate compartment fluidizing said particulate absorbant and forcing it to flow with said pressurized fluid through said conduit means and into said elongated guide tubes.

2. The combination of claim 1, wherein said elongated tubes further comprise strainers at their lower ends permitting escape of the pressure fluid from the ends of said tubes but preventing escape of said absorbant.

3. The combination as claimed in claim 1, wherein the axial cross section of the cylindrical tank leading from the closing element to said conduit means is flared in a direction towards said closing element.

* * * * *